3,628,147 XS1661

United States T370-104

[11] 3,628,147

[72] Inventor Kenichi Makino
Tokyo, Japan
[21] Appl. No. 883,448
[22] Filed Dec. 9, 1969
[45] Patented Dec. 14, 1971
[73] Assignee Tokyo Shibaura Electric Co., Ltd.
Kawasaki-shi, Japan

[54] TIME-DIVISION MULTIPLEX MOBILE COMMUNICATION SYSTEM

7 Claims, 24 Drawing Figs.

[52] U.S. Cl. .......... 325/4
[51] Int. Cl. .......... H046 7/14
[50] Field of Search .......... 340/23, 24, 32, 47; 325/3-5, 51, 53, 117, 312

[56] References Cited

UNITED STATES PATENTS 2,635,233 4/1953 Homrighous .......... 325/4 X

*Primary Examiner*—Ralph D. Blakeslee
*Attorney*—Kemon, Palmer & Estabrook

ABSTRACT: A time-division multiplex mobile communication system allowing communications to be made between a plurality of railroad trains travelling on a predetermined railroad line and a central base station through a plurality of repeater stations set up at a substantially equal distance along the line, which comprises means for carrying out communications between the central base station and each repeater station by a series of high-speed time-division multiplex signals, means for allowing each repeater station to translate series of high-speed pulses included in the signals thus transmitted which is directed to the repeater station into a series of slow pulses and modulating by the translated slow pulses a carrier wave allotted to each train which has as high a frequency as possible and radiating the output signal to each corresponding train through a radiation transmission line, means for allowing the supplied signals to be demodulated at each corresponding train, means for allowing return signals consisting of a series of slow pulses prepared by each train separately from the demodulated signals to be transmitted in a reverse direction to the preceding case, namely, from the radiation transmission line to each repeater station, means for allowing the return signals to the central base station to be translated into a series of high-speed pulses at each corresponding repeater station and inserting the translated high-speed pulses into that of the time slots associated with the series of time-division multiplex pulses which is allotted to other repeater stations so as to be sent back to the central base station and means for bringing a repeater station to be prepared to have communication links between base station and trains existing in adjacent repeater sections and to complete uninterrupted communications at the moment the trains enter said repeater section.

INVENTOR.
Kenichi Makino
BY
Kemon, Palmer & Estabrook

INVENTOR.

BY

INVENTOR.
Kenichi Makino
BY
Kemon, Palmer & Estabrook

INVENTOR.
BY Kenichi Makino

Kemon, Palmer & Estabrook

INVENTOR.
Kenichi Makino
BY
Kemon, Palmer & Estabrook

INVENTOR.
BY Kenichi Makino

Kemon, Palmer & Estabrook

INVENTOR.
BY Kenichi Makino

Kemon, Palmer & Estabrook

INVENTOR.
Kenichi Makino
BY
Kemon, Palmer & Estabrook

TIME-DIVISION MULTIPLEX MOBILE COMMUNICATION SYSTEM

BACKGROUND OF THE INVENTION

The present invention relates to a time-division multiplex mobile communication system and more particularly to a new form of such system which is adapted for use in the automatic operation control of trains travelling in the predetermined section of a railroad line according to a predetermined time table.

For briefness, there will now be described a concrete case where the run of trains is automatically controlled. For the automatic control of train runs, it is generally required to set up a two-way coded signal transmission link connecting a base ground station with trains in the service. Particularly to assure a reliable automatic control of train runs, it is desired that there be used such type of communication system as is capable of allowing coded signals to be transmitted with extremely few errors and preventing said communication from being momentarily interrupted. Moreover, since the aforesaid coded signal transmission links generally have to be laid over a considerable distance, it is necessary that to compensate for attenuation loss of signals on a transmission line, there be provided a fairly large number of repeaters along said line so as to divide it into numerous repeating sections. Further it is preferred that the end of portions of said section of transmission line associated with that of adjacent sections of the line be slightly overlapped or positioned as close to each other as possible in order to have constant radiation field strength from said transmission line for trains travelling along it for reliable transmission and reception of informations therebetween. As a result, there occurs a coupling between adjacent sections of said transmission line. If a repeating amplifier is provided for each repeating station to compensate for attenuation loss of signals on the transmission line it should have a high gain, then there will be fed back part of outputs from the repeating amplifier to is input side due to the occurrence of the aforementioned coupling between adjacent lines, thus leading to the instability of a repeater. Consequently, the length of each relay section is subject to limitation from the standpoint of assuring the stability of the repeater. For example, where the extent to which said coupling remains at the junction of adjacent sections of lines is assumed to be −30 db., then the degree of amplitude which is allowed for the stable operation of the repeater is generally restricted to about 24 db. max. On this account, too, the length of each relay section can not be much extended (actually so chosen as to be 2 to 3 kilometers at most), with the result that repeating stations have to be built in a considerable number.

A known communication system for automatic control of train runs includes a frequency division induction radio using a frequency band of 50 to 250 kHz. According to said radio system, there is allotted a different carrier frequency to each train and the base ground station is equipped with transmission and reception units having a corresponding number of trains used in the service. And each train has its own antenna and there are two-way coded signal transmission links laid along the railroad track so as to connect the base ground station with travelling trains. Each train utilizes said coded signal transmission links to furnish the base station with predetermined informations including its running speed and position at a given time. On the other hand, the base station processes such informations from the trains, for example, by computer and carries out necessary computation of informations with reference to the predetermined time table of trains and thereafter supplies travelling trains with control signals for driving, retardation or motor-brake notch as required, thereby automatically controlling the run of trains in a manner to meet the predetermined operation program.

However, where a transmission link for automatic control of train runs along the railroad track and inductively coupled with an antenna fitted to each train travelling along said track, the link is operated by a carrier wave having a relatively low frequency band such as 50 to 250 kHz. If trains are electrified, it is most likely that an artificial noise current is induced in said transmission line from such as a current passing through the train, trolley wire and rails. Further in an AC electrified section, the high frequency harmonics of a source current also often gives rise to such artificial noise current. Particularly if there is the so-called burst noise resulting from the high-frequency harmonics of a source current, there will most likely occur code errors even though there may be used an error check system, or a nonsignal state, i.e., momentary interruption. To avoid the intrusion of such artificial noise current as much as possible, it is advantageous to choose higher possible carrier frequency. To this end, it may be contemplated to utilize a high carrier frequency having, for example, a VHF band of 30 to 300 MHz or a UHF band above 300 MHz. A known mobile communication system including a high carrier frequency in the aforesaid VHF or UHF band includes a radio system using space waves as is practiced in a train telephone service. Since, however, such space wave radio system is unadapted due to irregular wave transmission for use in the coded signal communication where there is not admitted any momentary interruption, it is necessarily required to use induction-type transmission links or leaky transmission lines laid parallel to the railroad track. FIG. 1 represents a schematic arrangement of coded signal transmission links for automatic control of train runs by a frequency division multiplex system using a carrier frequency having the aforesaid VHF or UHF band. A computer (not shown) disposed in the central base station for automatic control of train runs generates control signals for driving, retardation and motor-brake notch or any of them with respect to trains travelling in the predetermined section of the railroad. For transmission to the train, said coded signals are first supplied to a base station transmitter 101 so as to cause the carrier wave in the VHF or UHF band to be subjected to code modulation (hereinafter referred to as "CM"). A CM train control signal from said transmitter 101 passes through a diplexer 102 and is supplied to a cable transmission line 104 divided into a plurality of repeater sections by a plurality of repeater stations 103 set up along the rail road track at a substantially equal distance. Each repeater station 103 is provided with a repeating amplifier to compensate for signal attenuation loss in each repeater section. Said station 103 selectively demodulates only those of the control signals transmitted from the base station transmitter 101 through the diplexer 102 and transmission line 104 and retransmit them for trains existing in the transmission coverage section, for which said repeater station is responsible. The demodulated signal at the repeating station modulates other given VHF or UHF waves for exclusive group of trains in the section of said repeater station (generally having the same number of waves as maximum number of trains existing in said repeater section). The modulated wave is supplied to the same transmission line 104 or, as illustrated, leaky coaxial cable lines 105. On the other hand, said modulated wave received by each train 106 (only a single car shown) having an antenna 107 coupled with the aforementioned leaky coaxial cable lines 105 is demodulated by a receiver (not shown) mounted thereon. The automatic control means of the train is actuated according to the content of the control coded signal it receives. On the other hand, information detected by a sensor (not shown) disposed in the train 106 concerning its present position, travelling speed or the like are supplied for modulation of the transmitter (not shown) provided in the train 106 and having a separate arrangement from its receiving system (said transmitter always generates a carrier wave having a different VHF or UHF frequency previously allotted thereto). Information coded signal is transmitted to a corresponding repeater station 103 through the train antenna 107 and leaky coaxial cable lines 105 in an opposite direction to that which is used in reception on the train. Informations from the train 106 received by its corresponding repeater station 103 is again transmitted to the central base station 101 through the repeater station 103 and transmission line 104 in turn, namely, in the reverse order to that which is used in transmitting signals from the central base station 101 to each train 106, and supplied to a base station receiver 108 through said diplexer 102. Information from the train 106 is demodulated by said base station receiver 108 and put in the aforesaid computer where it is processed and utilized in preparing the following control signals to be transmitted from said base station 101 to each train 106.

A coded signal transmission link of the aforementioned arrangement for automatic control of train operation uses a carrier wave of VHF or UHF band instead of those of in the band of 50 to 250 kHz. so that it displays a favorable effect of prominently preventing artificial noise signals caused by induction from being induced into said transmission link. Nevertheless, use of such a very high carrier frequency as aforesaid VHF or UHF band causes signals to be attenuated on a transmission line far more noticeably than when a low-frequency band such as 50 to 250 kHz. is used, and has the disadvantage of necessarily increasing the number of repeater stations. Further, with a coded signal transmission link using a frequency division system whereby there is allotted a different carrier wave for each train, it is required many carrier waves be amplified by each station, where there are operated a large number of trains, necessarily causing numerous signals having various frequencies to be transmitted between the base station and each train. Accordingly, a considerable number of carrier waves have to be transmitted in parallel at a narrow frequency interval, presenting great difficulties in eliminating the mutual interference of carrier wave due to the occurrence of a crosstalk. For example, where the ratio of desired to undesired signals has to be set at more than 40 db., it is necessary that the amplitude linearity of each repeater amplifier be generally of the order of 50 to 60 db. Therefore, where there are numerous carrier waves and repeater stations, said repeater amplifier should have a broad bandwidth and additionally a large capacity, so that its manufacture is accompanied with considerable difficulties. Now let it be assumed that there are operated 100 trains and the saturated output of a repeater amplifier required for each train is set at 0.01 watt. If, therefore, a single repeater amplifier installed in each repeater station should handle 100 trains, it will have to generate a saturated output of 100 watts, namely, 100 times the amplitude used in the aforesaid case. In case a repeater amplifier having such a large capacity is used in a transmission line which transmits a large number of carrier waves allocated at a narrow frequency interval, then there will occur more prominently a crosstalk due to cross modulation among the various carrier waves, resulting in a decreased signal-to-noise ratio and difficulties in practical application. Further with the prior art mobile communication system, there has to be allotted a different frequency to each train. This is not only undesirable from the standpoint of effectively utilizing electrical waves, but also prevents the interchangeability of various train parts, so that frequency channel change is needed if there is made a change in a timetable of trains at the starting station presenting much inconvenience in the maintenance of said parts and the operation of trains.

To eliminate the shortcomings of the above-mentioned frequency division system, there has heretofore been proposed the so-called single side band (hereinafter referred to as "SSB") multiplex communication system whereby there are allotted to trains a small number of channels in the VHF or UHF band, each repeater station is provided with a plurality of receivers for receiving said VHF or UHF signals allotted to the trains, and transmission of signals between a central base station and each repeater station is effected by connecting both stations with a single carrier wave SSB multiplex communication link so as to prominently reduce the occurrence of a crosstalk due to cross modulation among the various channels.

FIGS. 2A and 2B show a schematic arrangement of a link for transmitting signals from a central base station to each train, where the aforesaid SSB multiplex communication system is employed as a coded signal transmission link for automatic control of train runs. Now let it be assumed that one repeater station handles 12 trains at maximum and the central base station transmits a control signal consisting of a code of 50 baus to each train. Then there will be required for each repeater station coded signal links including 12 channels. If such code is translated into a telephone signal of 0.3 to 3.4 kHz. by a multiplex terminal equipment 201 (assuming that the occupied bandwidth of one telephone signal is 0 to 4 kHz.), then the aforementioned code links handling 12 channels can be grouped into a single telephone signal for each repeater station. Supposing that there are set up 60 repeater stations each handling 12 trains at a substantially equal distance along the railroad track, then use of an SSB multiplex terminal equipment will enable three telephone channels to be formed into one pregroup, four pregroups into one group, and five groups into one supergroup, thereby allowing numerous telephone coded signals allotted to 720 trains handled by said 60 repeater stations to be assembled into an SSB multiplex signal having a base bandwidth of 12 to 252 kHz. Referring to FIGS. 2A and 2B, control signals for every 12 trains are translated into one telephone signal by multiplex terminal station 201. Every three of such telephone signals are first grouped into one pregroup by a pregroup translator 202. Every four of such pregroups are translated into one group by a group translator 203. Accordingly, a signal represented by each such group will include train control coded signals corresponding to 12×12= 144 channels. Five of such groups are assembled into one supergroup by a super group translator 204, to form a signal consisting of a multiplex telephone coded signals having a base bandwidth of 12 to 252 kHz. Thus it will be understood that said base band signal comprises train control signals for 720 channels in total which are bundled in a predetermined sequence, and that the control signals to be transmitted to 12 trains handled by each repeater station are formed into one telephone signal included in said bundle. The base band signal is supplied to a base station transmitter 205 already generating a carrier wave having a given frequency such as in VHF or UHF band. After its carrier wave is subjected to Frequency or Phase Modulation, said base band signal is supplied to a transmission line 206 so as to be received at the plurality of repeater stations 207 located at a substantially equal distance along the railroad track.

On the other hand, each repeater station 207 should demodulate train control coded signals for 12 channels represented by one telephone signal which are used in controlling 12 trains at maximum present in that section of the railroad track for which said repeater station 207 is responsible. As shown in FIG. 2B, therefore, each repeater station 207 demodulates the base band signal received through the transmission line 206, and further demodulates a part of said base band signal to 12 telephone signals formed of 50-baus train control signals which correspond to that section of the railroad track for which said repeater station is responsible through a supergroup translator 208, group translator 209, pregroup translator 210 and terminal station translator 211 in the order mentioned, which are installed in said repeater station. Thereafter, the aforesaid coded signals for controlling 12 trains at maximum are put in 12 transmitters 301 to 312 installed in each repeater station 207 for each of these trains which have substantially the same arrangement as the base station transmitter 205. After being modulated, the carrier waves which have different frequencies for each of said 12 trains are transmitted to their corresponding trains. FIG. 3 shows a schematic arrangement of that part of the transmission link which connects each train (not shown) with each repeater station 207. Each train receives and demodulates train control coded signals supplied by the central base station as shown in FIG. 2. In FIG. 3, the train control coded signals for the 12 channels obtained at the terminal station 211 are supplied to their corresponding transmitters 301 to 312. Carrier waves in VHF or UHF band whose frequency is varied for each of said transmitter are subjected to phase shift keying (hereinafter referred to as "PSK") or frequency shift keying (hereinafter referred to as "FSK"), superposed through a transmitter branching filter 313 and supplied a leaky coaxial cable 315 through a diplexer 314.

On the other hand, information signals from each train are supplied to its corresponding repeater station 207 through a receiver branching filter 316 by a reverse operation to that which is used when there are transmitted train control coded signals by the repeater station, utilizing the carrier waves which vary with each train and in VHF or UHF band different from that which is used in said transmission. Said information signal is received and demodulated by VHF or UHF receivers (not shown) which are provided in said repeater station for each train to form a telephone coded signals representing said train informations. Conversely to the transmission of train control signals, said train informations are translated into one telephone signal of 0.3 to 3.4 kHz. by the multiplex terminal equipment at repeater station and supplied to each corresponding repeater equipment to be formed into an SSB multiplex signal and, after being overlapped by other similar SSB multiplex signals from different repeater stations, are sent to the central base station, where said train informations are demodulated and translated into a telephone signals of 720 channels.

An SSB multiplex communications system has indeed the advantage that it allows parts having better properties than are possible and easily procured and for practical application it is more safe from the intrusion of noises caused by cross modulation or crosstalk in transmission, translation, modulation and demodulation.

Nevertheless, with said SSB multiplex system, if, for example, 100 trains travel along the railroad there will be required 100 train tracking exchange devices each having 60 exchange contacts (assuming, as described above, that there are 60 repeater stations along a given railroad track). Accordingly, said system is complicated and presents technical difficulties in assuring very reliable communication link when a train moves over the junction between the repeater sections. Moreover, since said train tracking exchange device is actuated at that moment when each train passes over the junctions of the repeater sections, there likely occurs the momentary interruption of communication.

SUMMARY OF THE INVENTION

The present invention has been accomplished in view of the aforementioned circumstances and is intended to provide a novel time-division multiplex mobile communication system which allows its occupied bandwidth to be reduced as much possible and its modulation and demodulation system to be simplified, eliminates the possibility of communication being momentarily interrupted and always permits communication of high quality and reliability.

According to the present invention, communication between the central base station and each repeater station is carried out by a series of coded signals consisting of a plurality of time-division multiplex pulses having as high speed as possible, whereas transmission between each repeater station and each train is conducted by a series of coded signals of a plurality of pulses having as low speed as possible. Supply of signals from each train to the central base station through its corresponding repeater station at a given time is effected by inserting said signals into the time slots which has become vacant due to dropping of train signals by said corresponding repeater station. Further, the present invention is characterized in that even at the moment a train passes over the junction between two adjacent repeater sections, communication between the central base station and the train can be carried out fully continuously without using the aforesaid multiplex train tracing device and in consequence with freedom from any momentary interruption.

BRIEF EXPLANATION OF THE DRAWINGS

FIGS. 2A and 2B are schematic arrangements of that part of a coded signal transmission link which connects a central base station and each repeater station; and FIG. 3 is also a schematic arrangement of that part of a coded signal transmission link which connects each train and its corresponding repeater station;

FIGS. 4 to 10N relate to a time-division multiplex mobile communication system according to an embodiment of the present invention; FIG. 4 shows a concrete form of one frame period of a series of time-divided multiplex control signals transmitted by the central base station through repeater stations to each train for its control; FIG. 5 is a more detailed illustration of a series of control signals arranged within a unit time slot shown in FIG. 4; FIG. 6 indicates the concrete signals for each repeater station; FIG. 7 is a schematic block diagram of a time-division multiplex mobile communication system according to an embodiment of the invention; FIG. 8 represents a concrete circuit arrangement of a time-division multiplex mobile communication system according to an embodiment of the invention FIG. 9 shows a system for processing signals so as to prevent the momentary interruption of communication which occurs at the moment each train enters from one repeater section through which it is travelling to another; and FIGS. 10A to 10N are diagrams of the relative positions of a series of time slots associated with each repeater station.

DESCRIPTION OF THE PREFERRED EMBODIMENTS

There will now be described by reference to the drawings a time-division multiplex mobile communication system according to an embodiment of the present invention.

According to the present invention, train control signals consisting of, for example, those for driving, retardation and motor-brake notch which are supplied by a central base station to each train through a plurality of repeater stations set up at a substantially equal distance along the railroad track are transmitted in the form of time-divided multiplex signals for each preset repetitive period or frame period.

While said frame period is associated with the time constant of communication means mounted on each train, let it be assumed that said frame period is, for example, 0.5 second. Then the repetition frequency of each frame period will be 2 Hz. The number of signal groups which should be time divided into a multiplex form during each frame period is largely effected by the number of repeater sections and a maximum number of trains present in each such section. Now let it be assumed that there are 50 repeater sections in all and 12 trains at maximum are operated in each repeater section. The number of groups of control signals to be transmitted by the central base station to each train will amount to 12×50=600. Further let it be assumed that a control signal for each train per frame period consists of a pulsated code of 50 bits and that there are also added the synchronizing signals, start signals, stop signals and control and monitor signals for a related repeater station which are all required for each train and have the same number of code bits as control signals therefor. Then there will be required 16 groups of signals, namely, 16×50=800 bits of code for each repeater section. When there are added to the aforesaid 50 repeater sections other transmission sections associated with four kinds of signals, i.e., frame-synchronizing signals, start signals, space signals and stop signals, then all code bits to be transmitted per frame period will amount to 54×800=43,200, and in consequence the pulse speed of these code signals will be 86,400 bits/sec., if one frame period is taken to be 0.5 second as described above.

Figure 4:
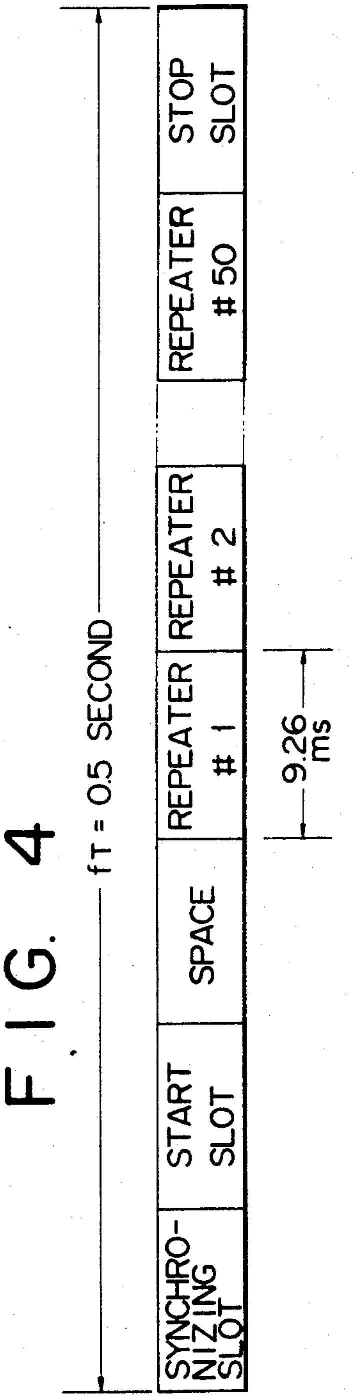

FIG. 4 shows a concrete form in which there are arranged during one frame period of 0.5 second a series of time-divided multiple pulse signals transmitted by the central base station through each repeater station to each train for its control. When there are 50 repeater sections and other additional sections associated with four kinds of signals, i.e., frame-synchronizing signals, start signals, space signals and stop signals, then one frame period $f_T$ is formed into 54 time slots divided in time sequence at an interval of 0.5/54 sec. = 9.26 ms. Thus as shown in FIG. 4, for example, there is allotted to the first time slot a frame-synchronizing pulse and to the following time slots a series of start pulse signals and the space signals which are used as described later, in the order mentioned. Thereafter there are allotted to the fourth and succeeding time slots a series of pulse signals for said 50 repeater stations in turn. And to a time slot following the last of the time slots associated with signals for said 50 repeater stations are allotted a series of stop pulse signals.

Figure 5:
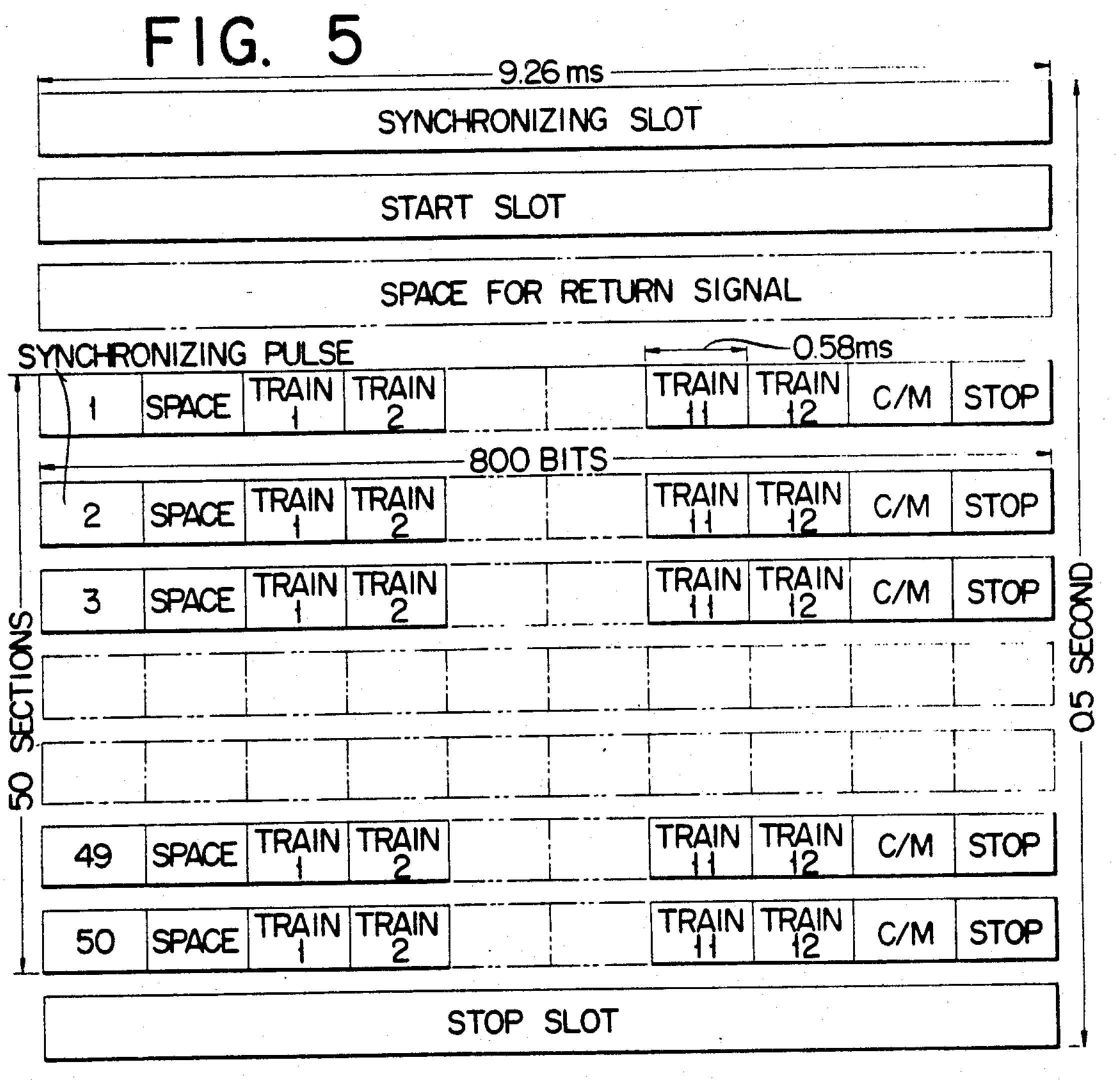
Figure 6:
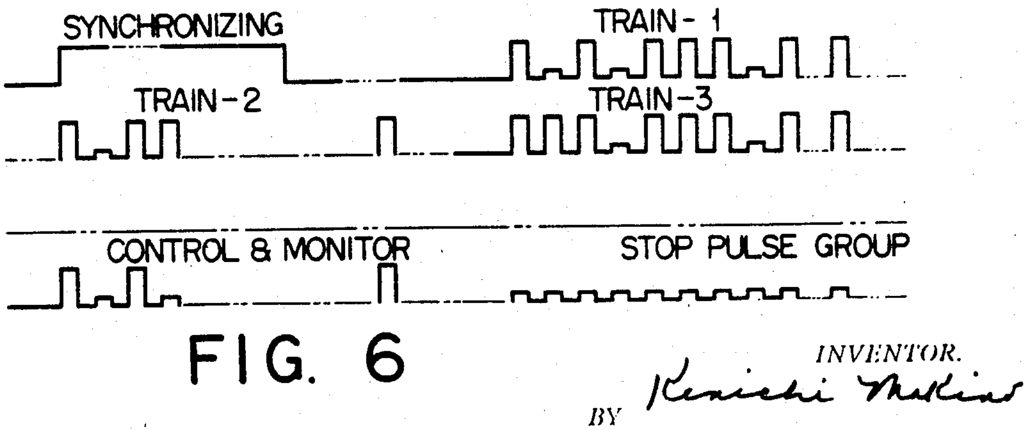

FIG. 5 shows in detail the manner in which there are arranged in a unit time slot a series of time-divided multiple control signals allotted to each repeater station. Namely, in a time slot allotted to each repeater station are arranged in turn, as shown in FIG. 5, synchronizing signals, space signals, control signals for each of the aforesaid 12 trains, control-monitor signals for each repeater station (hereinafter referred to as "C/M" and stop signals. FIG. 6 shows the concrete wave forms of pulse signals transmitted to each station when they are arranged in the aforesaid order.

There are transmitted by the central base station to each repeater station time-division multiplex pulse codes of 86,400 bits/sec. including those to be supplied to 600 trains, after subjecting a carrier wave, for example, of 10 MHz. to PSK or FSK.

On the other hand, each repeater station receives from the central base station a series of time-divided multiplex high-speed signals of 86,400 bits/sec. including control signals for each train and selectively drops out only the group of pulses which is included in a time slot corresponding to said repeating section. Said group of pulses is divided into minor groups of pulses classified for 12 trains at maximum present in each repeater section. After the 12 carrier waves in VHF and UHF band previously allotted to each train are separately subjected for each train, the resultant outputs are transmitted through a leaky coaxial cable.

Since signals to be transmitted between the base station and each repeater station consist, in this embodiment, of a series of high-speed pulse codes of 86,400 bits/sec., said transmission of control signals for one train is effected in an extremely short time, as only in one of several hundred parts of one frame period, so that there is always assured communication of fully high density and reliability.

On the other hand, communication between each repeater station and each of the trains present in each repeater section for which said station is responsible is conducted by a series of pulses fully slower than those used between the central base station and each repeater station. Accordingly, this is adapted to reduce the occupied bandwidth of said slow signals and simplify the arrangement of circuits used in their modulation and demodulation in the equipment on the train.

Figure 7:
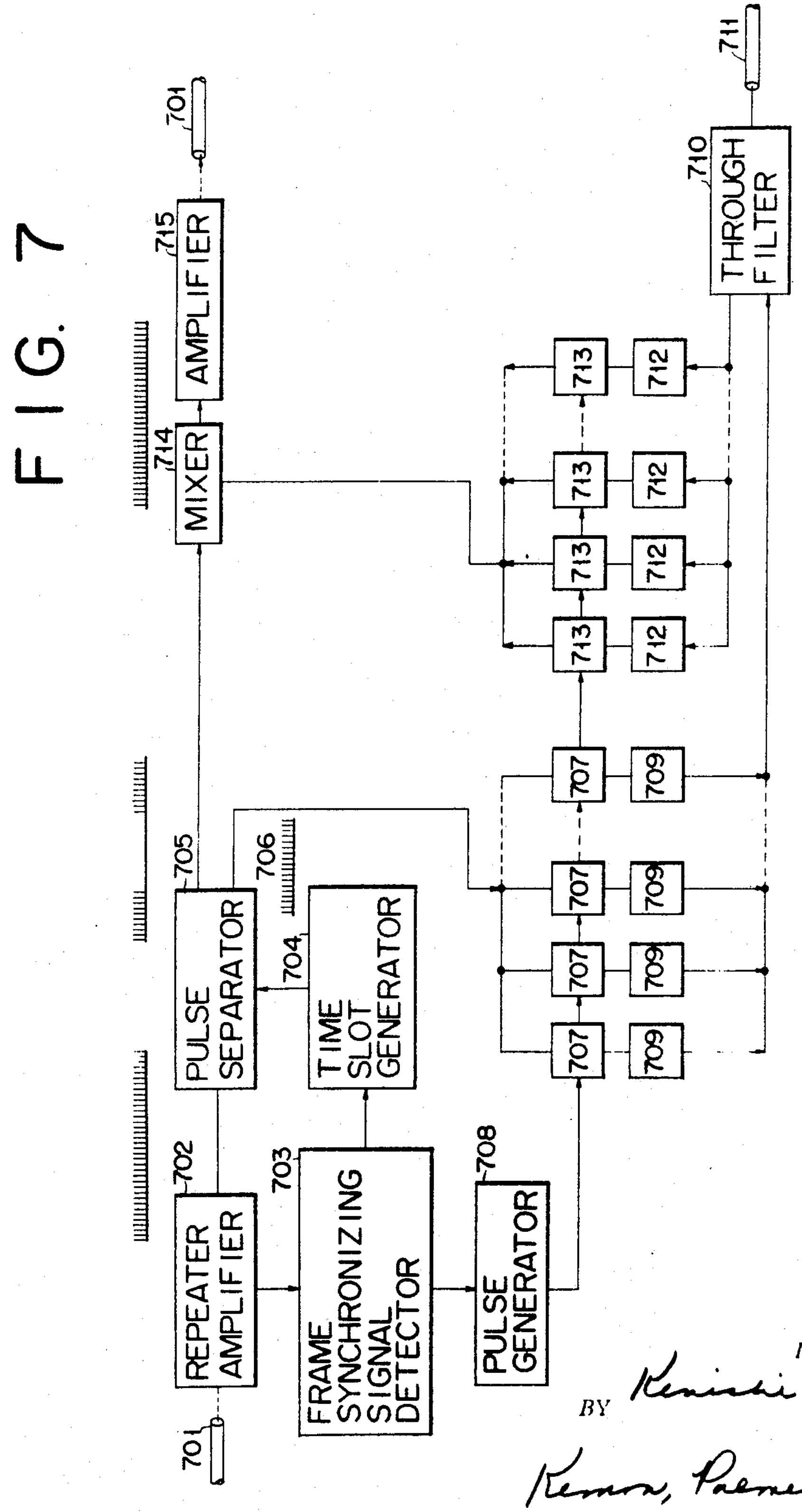

FIG. 7 is a schematic block diagram of a time-division multiplex communication system according to an embodiment of the present invention having an arrangement adapted for use in the aforesaid communication system. For briefness, this figure represents the main arrangement of only one repeater section. Train control signals for all trains formed by subjecting a carrier wave of, for example, 10 MHz. to PSK or FSK by base band signals consisting of time-divided high-speed pulse codes of 86,400 bits/sec. as described above are transmitted to all trains from the central base station (not shown) through each repeater station by transmitting through a transmission line 701 to a repeater amplifier 702 provided in each repeater station, where the aforesaid carrier wave is demodulated into base band signals. The base band signals from said repeater receiver 802 are put in a frame-synchronizing detector 703 so as to detect frame-synchronizing signal out of said base band signal into the first unit time slot shown in FIG. 4. Under control of the frame-synchronizing signal detected by said detector 703 there is generated a time slot corresponding to a related repeater station by a time slot generator 704. The time slot generated by said generator 704 is forwarded to a pulse separator 705 so as to selectively drop out only a series of pulse codes 706 included in said time slot from the aforesaid time-divided multiplex base band signal supplied to said pulse separator 705 through said repeater amplifier 702. The other portion of said series of pulse codes 706 remaining in said time slot is sent to the following repeater station through said transmission line 701. A group of high-speed pulses for a related repeater station taken out by said pulse separator 705 in the aforementioned manner are divided into minor groups of high-speed pulses for each train under control oy gate pulse for each train generated by a time slot generator 704. These minor groups of pulses are temporarily stored in 12 registers 707 corresponding to the 12 trains. Said minor groups of high-speed pulses for each train temporarily stored in said 12 registers 707 are translated under control of the frame-synchronizing signal detected by said detector 703 to a series of slow pulse codes for each train by outputs from a pulse generator 708 for generating pulses having the same time width as said frame-synchronizing signal and then supplied to 12 transmitters 709 corresponding to the 12 trains each of which is generating a carrier wave having a VHF or UHF band previously allotted to each of said trains so as to subject said carrier wave to PSK or FSK. Control signals for these trains which consist of 12 slow pulse codes formed by subjecting said carrier wave to PSK or FSK are separately supplied to each of the trains through a radiation transmission line 711, which is coupled to train antenna (not shown). Upon receipt of train control signal originated from the central base station, each train controls its devices according to the subject matter of said control signals.

On the other hand, information to be supplied from each train to the central base station consists of slow pulse coded signals same as to train control signals. Said slow pulse code from each train subjects to PSK or FSK a carrier wave in VHF or UHF band which is previously allotted to each of the trains but is different from that which is allocated for train control signals. The resultant output signal is transmitted via the radiation transmission line 711 and through the filter 710 in turn, a reverse direction to the case of train control signals, and demodulated by a receiver 712 at the repeating station provided for each of the 12 trains. Information signals from each train to the central base station which have been demodulated by said receiver 712 are put in 12 registers 713 corresponding to the 12 trains respectively under control of output pulses from said pulse generator 708 to be temporarily stored therein, and then translated, as in the case of train control signals, into a series of high-speed pulse coded signals under control of outputs from said time slot generator 704 for generating time slots corresponding to each train. Said information signals from each train to the central base station which consist of said series of high-speed pulse codes are supplied to a mixer 714 installed in each repeater station together with a base band signal obtained from said repeater amplifier 702 and having a vacant time slot corresponding to each repeater station which has become vacant due to the drop out of the train control signal transmitted to said station, and inserted into said vacant time slot so as to be mixed with said baseband signal. These mixed signals are transmitted to succeeding repeater station through an amplifier 715 and the transmission line 701. If, in this case, one of the repeater stations between the starting and terminal railroad stations allots to the 12 trains 12 different frequencies selected from those in VHF or UHF band, all the other repeater stations allot exactly the same frequencies to these trains. Namely, there are only required 12 different frequencies to designate for all trains travelling on the entire railroad line (for example, 720 trains, assuming that there are set up 60 repeater stations and 12 trains travel in one repeater section at a given time). Now supposing that up and down train runs are on separate tracks, namely 6 trains are on each of said tracks, there is substantially no possibility of trains allocated with the same frequency entering the up or down track of the same repeater section at the same time, so that the aforementioned frequency allocating system will not substantially present any practical difficulties. According to the present invention, therefore, communication between each repeater station and each of said 12 trains only requires 12 different frequencies in controlling at the same time a very large number of trains (totalling 720) in this embodiment. As compared with the prior art frequency division communication system, therefore, which allots different frequencies to all trains travelling throughout a given railroad line, the time-division multiplex communication system of the present invention permits a very effective utilization of electromagnetic waves and assures good interchangeability among the parts of train equipment. Further, since communication between the central base station and each repeater station is performed, as described above, by a series of high-speed pulse codes, trains can be controlled continuously. On the other hand, communication between each repeater station and each train is carried out by a series of slow pulse codes. This is adapted to reduce the occupied width of the aforesaid VHF or UHF band and simplify the arrangement of circuits for modulation and demodulation.

When a train passes over the junction of two adjacent repeater sections, communication with the train has to be made by the corresponding two repeater stations. In such case, the prior art multiplex train tracking exchange device often causes momentary interruption of communication. However, the present invention allows the repeater station of the succeeding repeater section in the direction of a train run to be previously brought to a communicable state while the train still exists in the preceding repeater section, thus eliminating such momentary interruption.

A carrier wave transmitted through a transmission line to connect the central base station and each repeater station may consist of a frequency in VHF or UHF band. However, a carrier wave formed of an unduly high frequency leads to prominent transmission loss, although it affords advantage from the standpoint of preventing the occurrence of static noises and crosstalk. Moreover, a transmission line for high frequency is generally difficult to manufacture and expensive, so that it is preferable to choose a frequency of about 10 MHz. as described above.

Figure 8:
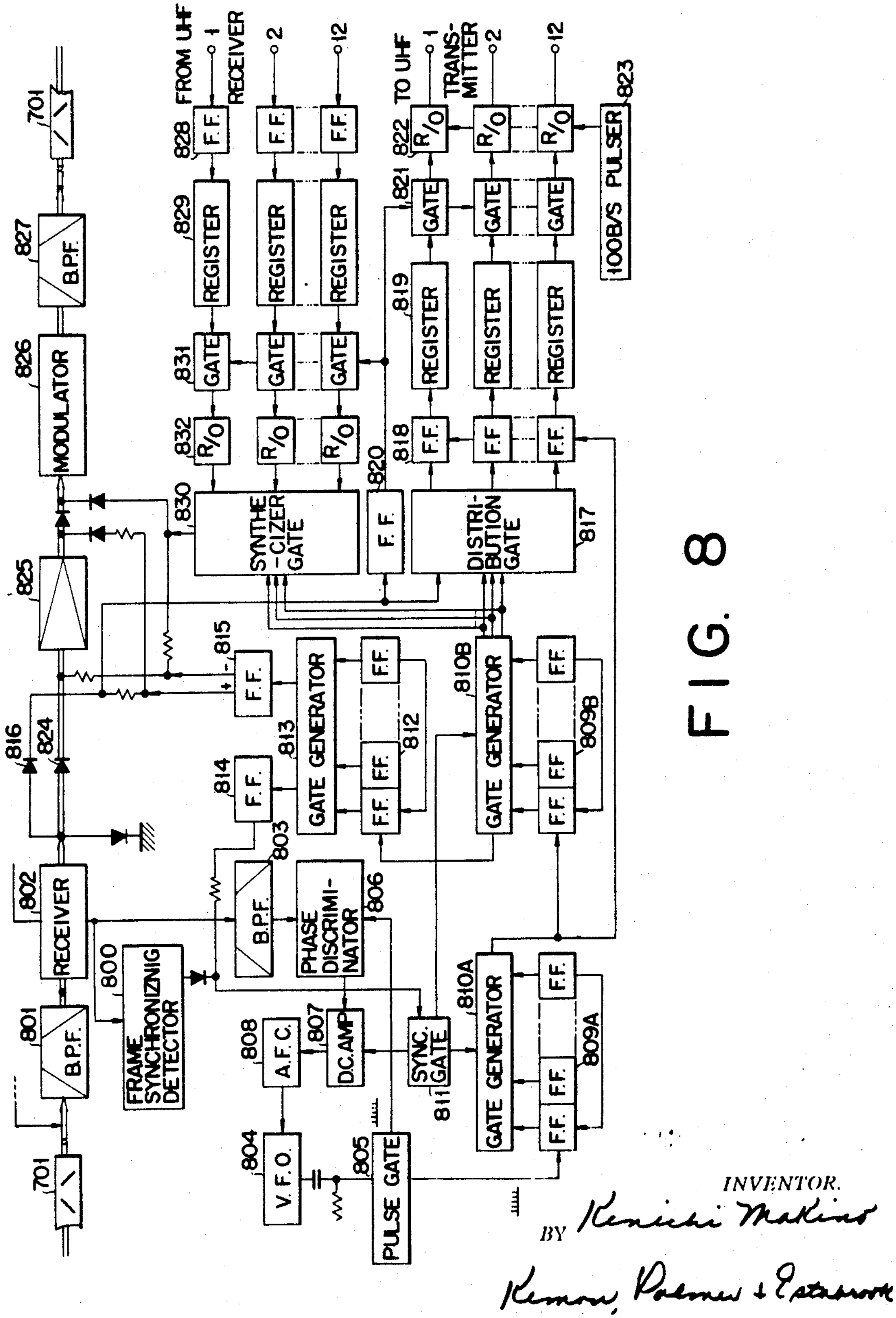

FIG. 8 shows a concrete circuit arrangement of a time-division multiplex mobile communication system according to an embodiment of the invention. Train control signals consisting of a series of high-speed pulse codes of 86,400 bits/sec. having a repetition period of time-division second form time-division multiplex base band modulate in the manner as described with reference to FIGS. 4 to 6. This train control coded signals, base band signals, are subjected to modulation of transmitting carrier wave of, for example, 10 MHz. and at first supplied through the transmission line 701 to a band-pass filter 801 having a band pass around 10 MHz. to remove other unnecessary frequency components. The resultant output is put in a repeater station receiver 802 to be demodulated. The base band signal thus demodulated is supplied to a frame-synchronizing signal detector 800 to detect from said base band signal a frame-synchronizing signal of 9.26 ms. width and 0.5 sec. period (=0.5/54 sec.) as shown in FIGS. 4 to 6.

On the other hand, a series of high-speed pulse codes of 86,400 bits/sec. included in said base band signal is filtered through a band-pass filter 803, and forwarded to a phase discriminator 806 together with a series of 86,400 Hz. high-speed pulse trains obtained through a pulse gate 805 generated by a 86,400 Hz. variable frequency oscillator (hereinafter referred to as "VFO") 804 so as to carry out phase comparison. Said discriminated DC voltage is further allowed to pass through a DC amplifier 807 and a circuit 808 of automatic frequency control (hereinafter referred to as "AFC") so as to allow said VFO always to fully synchronize with a series of input pulse codes of 86,400 bits/sec. demodulated by said receiver 802. Output signals from said VFO 804 always automatically controlled so as to fully synchronize with said series of 86,400 bits/sec. demodulated by said receiver 802. Output signals from said VFO 804 always automatically controlled so as to fully synchronize with said series of 86,400 bits/sec. input pulse codes are shaped into a series of 86,400 bits/sec. high-speed pulse trains through said pulse gate 805. To obtain a series of pulses having a repetition time rate (about 0.58 ms.) corresponding to a 50 bits control signal for one train, the aforementioned 86,400 bits/sec. high-speed pulse codes are supplied to a first frequency divider 809A so as to be translated into a series of pulse codes having a repetition frequency equal to one-fiftieth of the aforesaid 86,400 bits/sec. namely, 1,728 bits/sec. A series of output pulse codes of 1,728 bits/sec. from said frequency divider 809A is put in a synchronized gate pulse generation circuit 810A to be synchronized by the frame-synchronizing signal of the train control signal from the central base station detected by the frame-synchronizing signal detector 800 and obtained through a synchronizing gate circuit 811 in order that said 1,728 bits/sec. pulse codes are properly controlled in its position.

Generated pulse codes of 1,728 bits/sec. have a period of 0.58 ms. corresponding to the time slot of control signals for each train and the width of the pulse is 0.0116 ms. corresponding to one bit of train control codes (86.4 kb./sec.). A series of outputs of 1,728 bits/sec. from said synchronizing gate pulse generator 810A, are supplied to a second frequency divider 809B so as to be translated into a series of pulse codes having a repetitive frequency equal to one-sixteenth of the aforesaid 1,728 bits/sec., namely 108 bits/sec. A series of output pulse codes of 108 bits/sec. from said frequency divider 809B are put in a synchronizing gate pulse generation circuit 810B to be synchronized by the frame-synchronizing signal included in the train control signal from the central base station in the same manner as in the case of the first gate generator 810A.

The repetitive period of said synchronizing pulse is 9.26 ms. which corresponds to the width of time slot of train control signals for each repeater station and the width of the pulse is 0.58 ms., which corresponds to the width of synchronizing pulse of pulse codes for each train as shown in FIG. 5. There are generated 12 outputs of identical synchronizing pulses by said gate generator 810B, each of which the position of a synchronizing pulse is delayed by 0.58 ms. corresponding to the width of pulse, with respect to each synchronizing pulse.

Consequently, each of the 12 consecutively arranged synchronizing pulses included in the output from gate generator 810B corresponds to the time slot of each of the 12 trains to be operated in each repeater section.

Figure 1:
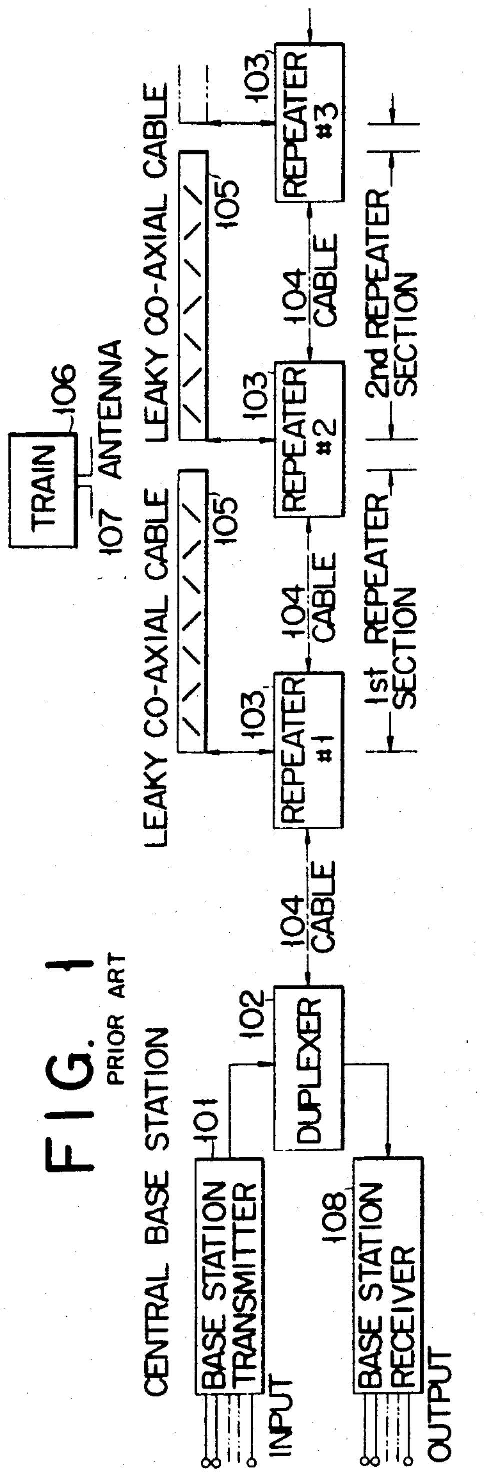
FIG. 1 is a schematic arrangement of one form of a coded signal transmission link for a moving object using prior art frequency division system.
Figure 3:
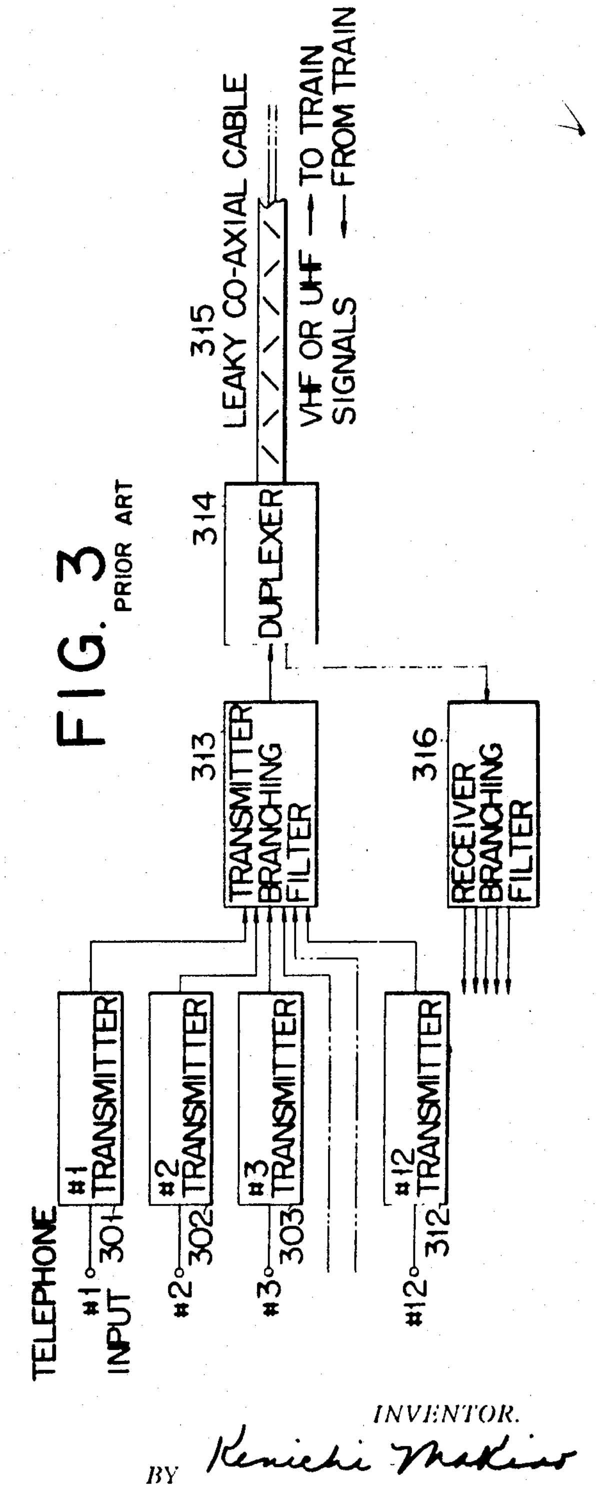
FIGS. 2A, 2B and 3 show other forms of said coded signal transmission link for a moving object using the prior art frequency division system.
Figure 2A:
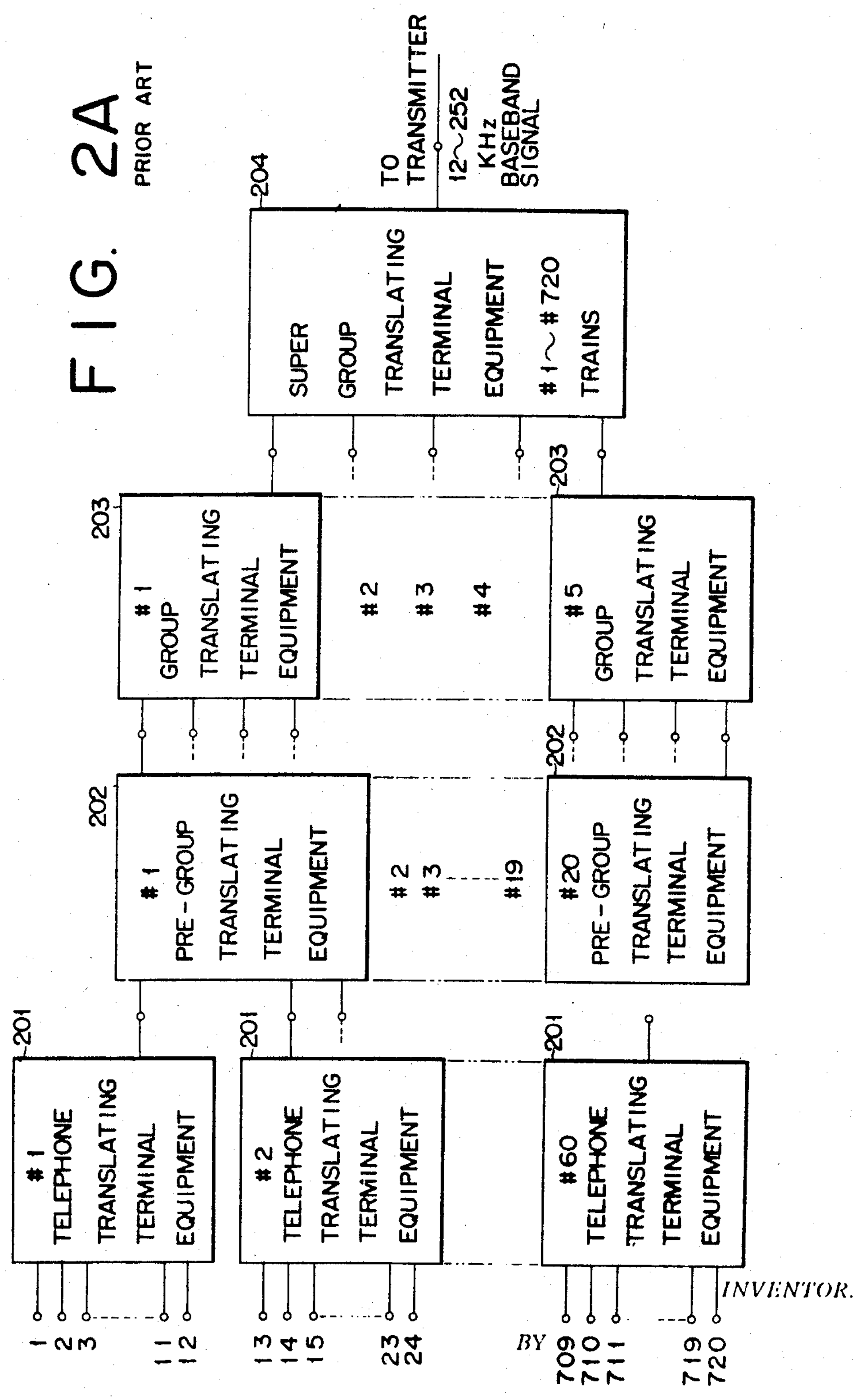
FIG. 2A PRIOR ART
Figure 2B:
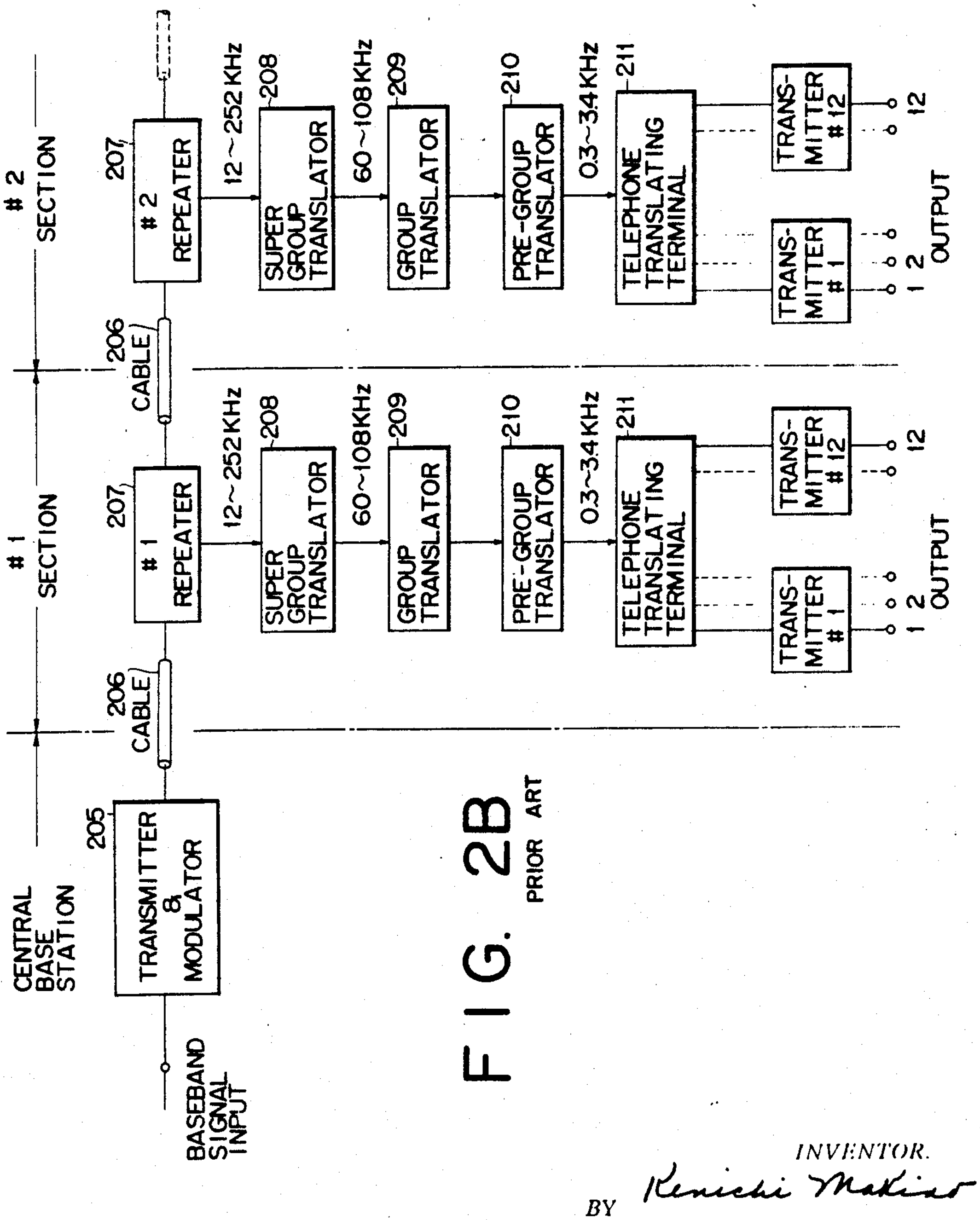
FIG. 2B PRIOR ART

These synchronizing pulses put out from gate generator 810B are used in converting the speed of train control pulse codes in each repeater station from a series of high-speed pulse codes to that of slow ones or vice versa. Said series of 108 bits/sec. pulse codes from said synchronizing gate pulse generation circuit 810B are supplied to a third frequency divider 812 consisting of a combination of a plurality of R–S flip-flop circuits and a gate pulse generation circuit 813 so as to be translated into a series of pulse codes each having a frequency equal to one fifty-fourth of the aforesaid 108 bits/sec., namely, 2 bits/sec. The width of said pulse codes put out from the gate generator 813 is 9.26 ms., which corresponds to the width of synchronizing time slot of train control signals sent from the central base station with a repetitive period of 0.5 sec. equal to the frame-synchronizing pulse. The gate generator 813 is capable of generating gate signals corresponding to synchronizing pulses consecutively arranged with a time interval of 9.26 ms. The first of said 54 synchronizing pulses is used to detect the synchronizing time slot of train control signals sent from the central base station so as to be coupled with the output of the frame synchronizing detector 800 through a flip-flop circuit 814A. The coincidence of both synchronizing time slot and pulse is detected to excite the synchronizing gate 811, and the synchronizing is held by means of feeding back to the aforementioned gate generator 810A. One synchronizing pulse having a specific pulse position amount 54 synchronizing pulses generated by gate generator 813, which corresponds to said repeater section is supplied through flip-flop circuit 815 to a diode 816 for detecting the time slot of said repeater station as its bias voltage in order to detect the said train control signal transmitted by the central base station to said repeater station. A series of pulses codes positioned in the time slot of said repeater station pass through said diode 816 which is conducted only for 9.26 ms. corresponding to said time slot for each repetitive period of 0.5 sec., and remain unconducted for a length of time corresponding to the time slots of other repeater stations, and then supplied to a distribution gate 817 whose start is controlled by 12 sets of output gate pulses from said synchronizing gate pulse generation circuit 810B. As a result, a series of pulse codes included in the train control signal for said repeater station which is detected by said diode 815 are divided by said distribution gate 817 into minor groups of pulse codes for each train having a time width of 0.58 ms. Said divided minor groups of pulse codes are forwarded to their corresponding 12 memory register circuits 819 to be temporarily stored therein through the corresponding 12 R–S flip-flop circuits 818 whose start is controlled by outputs from said synchronizing gate pulse generation circuit 810A. The number of memory bits of each os said memory register circuits 819 is equal to that of code bits constituting the train control signal for each train, namely, 50 bits and the memory and duration speed is 0.58 ms. and 86,400 bits/sec., respectively. The control signals for the 12 trains consisting of a series of pulse codes for each train which have been temporarily stored in said 12 memory register circuits 819 are supplied to a gate circuit 821, consisting of, for example, 12 R–S flip-flop circuits which are actuated by outputs from a flip-flop circuit 820 whose start is controlled by detected outputs from said diode 816 and are read out once in every period of 0.5 second or frame frequency by the corresponding 12 readout circuits 822. The readout speed of each of said 12 readout circuits 822 is controlled to 100 bits/sec. by outputs from a pulser 823 generating pulses of, for example, 100 bits/sec. The train control signals read out by said 12 readout circuits 822 are supplied, for example, as in FIG. 3, to the modulation circuits of the corresponding 12 VHF or UHF transmitters classified by each train. After the carrier waves in VHF or UHF band corresponding to said 12 transmitters are subjected to PSK or FSK, said train control signals are transmitted to each train through a branch filter and leaky coaxial cable. Among the train control signals demodulated by said repeater receiver 802, that for a given repeater station is detected by said diode 816, and processed by said station in the aforementioned manner. However, the remainder of said train control signals transmitted by the central base station passes through a diode 824, which is biased by the flip-flop circuit 815 and suitably amplified by an amplifier 825. Informations from the trains in said repeater section in the form of coded signal are time division, multiplexed in a 9.26-ms. time slot and put in a modulator 826 together with above-mentioned coded signals. The resultant output is put in the modulator 826 of a repeater transmitter again to subject a carrier wave of 10 MHz. to PSK or FSK and transmitted to the succeeding repeater station through a band-pass filter 827 mainly handling a carrier wave of 10 MHz. and transmission line 701.

On the other hand, informations to be transmitted by each train towards the central base station are generated by sensers installed in the train with respect to, for example, its current travelling speed and position and formed on the train into a series of 50-bit pulse codes having a frame period of 0.5 second, and subject to PSK or FSK one of the 12 carrier wave having different frequency channel in VHF or UHF band. Each repeater station is provided with 12 receivers (not shown) for demodulating PSK or FSK signals which transmitted from each train. Demodulated train informations from each train to the central base section excite 12 R–S flip-flop circuits 828 shown in FIG. 8 and temporarily stored in 12 corresponding memory register circuits 829 at a speed of 100 bits/sec. The contents of these memory register circuits 829 are read out in high speed in turn as informations on said 12 trains by a synthesizer gate 830 which is synchronized by outputs from the synchronizing gate pulse generator 810B as in the case of the distribution gate 817 once in a period of 0.5 second through 12 gate circuits 831 and readout circuits 832. Namely, outputs from said 12 memory register circuits 829 are introduced into said synthesizer gate 830 in the form of a series of pulses with total time slot of 9.26 ms. Total time width of a series of pulses brought into said synthesizer gate 830 is exactly the same as that of the time slot of one repeater station, so that said pulses can be easily synchronized with the time slot which has become vacant due to the dropping out of train control signals transmitted by the central base station to said repeater station as a result of switching by the diodes 816 and 824. The information signals from each train introduced into said synthesizer gate 830 are inserted into the time slot of the corresponding repeater station which became vacant as mentioned above by the control voltage from the flip-flop circuit 815, so as to be transmitted to the central base station.

As mentioned above, according to the present invention, train control signals destined to a number of trains are transmitted by the central base station and dropped at the repeater station where there exist said trains. Informations from said trains which is brought by being inserted into each of the corresponding time slots are transmitted in the direction of succeeding repeater stations, in order to have the time slot to be used very effectively. At the furthest repeater station, the train control signal from the central station is all replaced by informations from the trains. Accordingly, all that is required is to return said informations to the central base station by shifting the carrier frequency associated with said informations, for example, from 10 MHz. to 2 MHz. In this case, the intervening repeater stations need not carry out modulation or demodulation, but only require an amplifier to compensate for transmission loss of signals and a band-pass filter to assure good quality signals for return circuit.

Moreover, the present invention can prevent in the following manner the momentary interruption of communication which generally arises with the prior art communication system when a train passes over the junction between two adjacent repeater sections.

Figure 9:
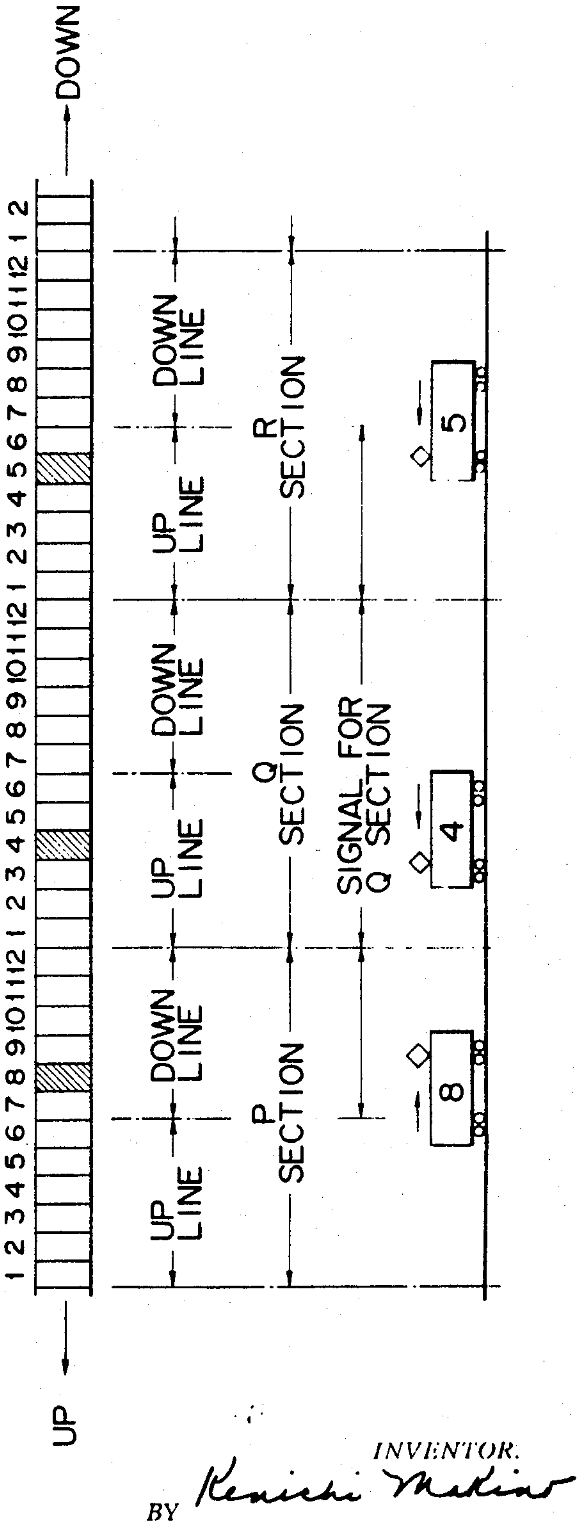

Now let it be assumed that as shown in FIG. 9 there are defined three adjacent repeater sections P, Q and R, and that there are operated a down train No. 8 and up trains No. 4 and No. 5 in the indicated repeater sections. Let us consider first train No. 4 travelling in section Q. Since this train can be covered by signals lying in a time slot corresponding to said section Q, it presents no problem. However, trains No. 8 and No. 5 are expected to enter section Q very soon. Accordingly, when a repeater station of section Q drops out train control signals which are destined to the trains to be in said section, it is required to detect the time slots allotted to the down train No. 8 in section P and the up train No. 5 in section R at the same time. When each of the time slot divisions 7, 8, 9, 10, 11 and 12 in section P and each of the time slot divisions 1, 2, 3, 4, 5 and 6 in section R, a total length of time equal to one time slot or about 9.26 ms. are overlapped with respectively numbered time slot divisions to overlap those in section Q and store the train control signals in the 12 memory register circuits for each train, it enables the train control signals for each train to be transmitted well ahead of the advance of each train to a given repeater section Q in this case, eliminating the possibility of momentary interruption of communication occurring at the moment the train passes over the junction of two adjacent repeater sections.

In this case, repeater station P can not drop out the time slot divisions on the latter half of time slot divisions of section P, namely, the time slot divisions for the down train No. 8, because the information included in said down train time slot divisions is required in the succeeding repeater station Q. However, informations concerning trains obtained at section Q can be inserted into the space time slot of the preceding section P, because the time slot of said section P can be already vacant at section Q. If, in consideration of the aforesaid case, provided in a space time slot corresponding to one repeater section immediately before repeater section No. 1 elimination of signal interruption can be effected very stably.

Figure 10A:
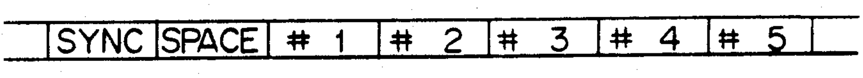
Figure 10B:
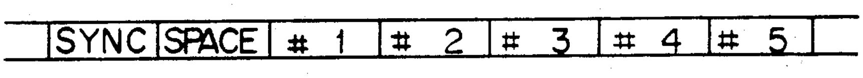
Figure 10C:
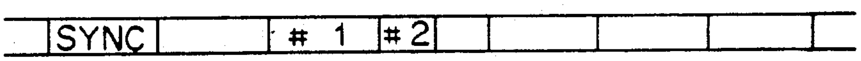
Figure 10D:
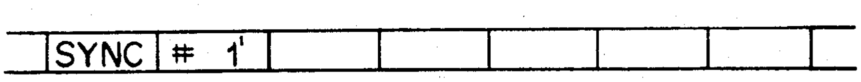
Figure 10E:
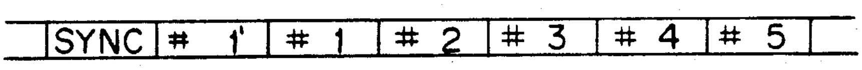
Figure 10F:
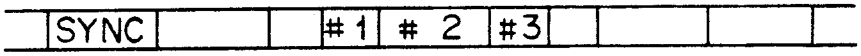
Figure 10G:
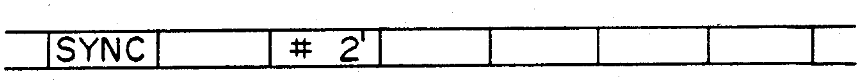
Figure 10H:
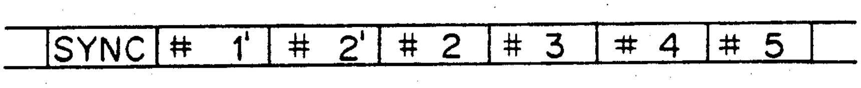
Figure 10I:
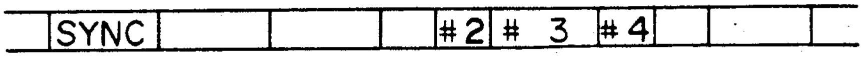

FIG. 10A shows the arrangement of time slots of a series of signals transmitted by the central base station to each register station, FIG. 10B the arrangement of time slots of a series of signals received by repeater station No. 1 from the central base station, FIG. 10C the arrangement of time slots of those of the series of signals shown in FIG. 10A which are to be received and dropped out by repeater station No. 1, FIG. 10D the arrangement of time slots of a series of train information signals supplied by repeater station No. 1 to the central base station, FIG. 10E the arrangement of time slots of a series of signals received by repeater station No. 2 from repeater station No. 1, FIG. 10F the arrangement of time slots of a series of signals to be dropped by repeater station No. 2 for each train travelling in its own repeater section, FIG. 10G the arrangement of time slots of a series of train information signals supplied by repeater station No. 2 to the central base station, FIG. 10H the arrangement of time slots of a series of signals received by repeater station No. 3 form repeater station No. 2. FIG. 10I the arrangement of time slots of a series of signals dropped by repeater station No. 3 for each train travelling in its own repeater section, FIG. 10J the arrangement of time slots of a series of train information signals supplied by repeater station No. 3 to the central base station, FIG. 10K the arrangement of time slots of a series of signals received by repeater station No. 4 from repeater station No. 3, FIG. 10L the arrangement of time slots of a series of signals dropped by repeater station No. 4 for each train travelling in its won repeater section, FIG. 10M the arrangement of time slots of a series of train information signals supplied by repeater station No. 4 to the central base station and FIG. 10N the arrangement of time slots of a series of signals received by repeater station No. 5 from repeater station No. 4. Each of the succeeding repeater stations processes signals using time slots arranged in FIG. 10.

Figure 10J:
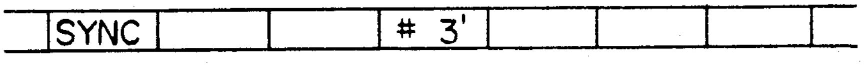
Figure 10K:
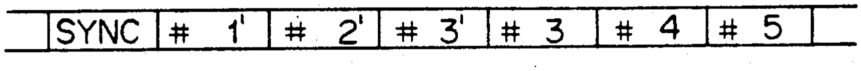
Figure 10L:
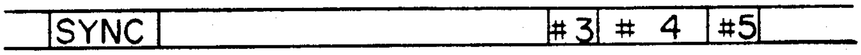
Figure 10M:
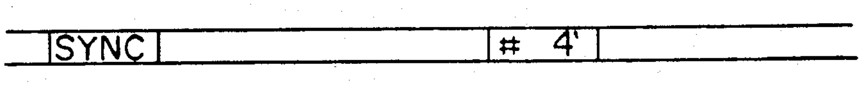
Figure 10N:
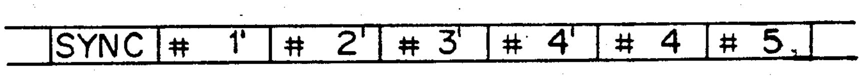

According to the aforementioned form in which signals are processed, or the arrangement of time slots, for example in repeater section No. 3, these train information signals No. 2' from trains existing in repeater section No. 2 are inserted in the space time slot of said repeater section No. 1. To the succeeding repeater stations are supplied signals in the order of No. 1', No. 2', No. 2, No. 3 as shown in FIG. 10H. As shown in FIG. 10I, repeater station No. 3 supplies signals to a down train present in the repeater section of repeater station No. 2, an up train present in the repeater section of repeater station No. 4, and together with up and down trains present in the repeater section of repeater station No. 3. In this case, however, though said down train of repeater section No. 1 and up train of repeater section No. 4 do not yet enter repeater section No. 3, this station is supplied in advance with signals concerning these two trains. With respect to signals No. 3' to be transmitted to the central base station through repeater station No. 3 by each train present in its own repeater section, signals in the time slot No. 2 are firstly dropped out, as shown in FIG. 10J, and instead the aforesaid signals No. 3' are inserted into the time slot No. 2 which has now become vacant due to said dropping out. Then said signals No. 3' are forwarded in the order of time slots shown in FIG. 10K, namely No. 1', No. 2', No. 3', No. 3, No. 4 and No. 5.

When the above-mentioned operation is repeated, the transmitting central base station and the terminal receiving station will receive signals from each train in the form displaced by a length of time equal to one unit time slot as compared with the signals initially transmitted by said central base station.

What is claimed is:

1. A time-division multiplex mobile communication system allowing communication between movable objects travelling on a prescribed service line and a central base station to be conducted through a plurality of repeater stations set up at a substantially equal distance along said service line, which comprises a first means for carrying out communication from said central base station to each repeater station by a series of high-speed time-division multiplex pulse codes, a second means for allowing each repeater station to translate those of said series of high-speed pulse codes supplied thereto which are particularly converted to itself into a series of slow pulse codes, modulate carrier waves having as high a frequency as possible allotted to each movable object in its charge by said slow pulse codes and supply through a radiation transmission line said modulated signals to said movable object, a third means installed in said movable object for demodulating signals thus supplied thereto, a fourth means for allowing return signals consisting of slow pulse codes prepared by each movable object separately from said demodulated signals to be supplied reversely to each repeater station through said radiation transmission line, and a fifth means installed in each repeater station for translating said slow speed signals directed to the central base station into high-speed pulse codes and sending said translated signals back to the central base station.

2. The communication system according to claim 1 wherein said return signals from each repeater station are sent back to the central base station by being inserted into that of the time slots associated with said series of time-division multiplex pulse codes which is allotted to each repeater station and has now become vacant after drop out and demodulation by said second means.

3. The communication system according to claim 1 wherein reception by each repeater station according to said second means of those of a series of time-division multiplex pulse codes transmitted by the central base station which are particularly directed to itself is carried out by controlling the bias voltage of a diode.

4. The communication system according to claim 1 wherein supply of high-speed pulse codes by said second and fourth means is made at a speed corresponding to the code bit frequency forming said series of time-division multiplex pulse codes and supply of said series of slow pulse codes by said two means is conducted at a speed corresponding to a fraction of the total code bits forming a series of signals for each movable object as compared with said series of high-speed pulse codes.

5. The communication system according to claim 2 wherein supply of high-speed pulse codes by said second and fourth means is made at a speed corresponding to the code bit frequency forming said series of time-division multiplex pulse codes and supply of said series of slow pulse codes by said two means is conducted at a speed corresponding to a fraction of the total code bits forming a series of signals for each movable object as compared with said series of high-speed pulse codes.

6. The communication system according to claim 2 wherein return signals from each repeater station to the central base station are inserted into a time slot allotted to each repeater station by controlling the bias voltage of said diode.

7. A time-division multiplex mobile communication system allowing communication between movable objects traveling on a predetermined service line and a central base station to be performed through a plurality of repeater stations set up at a substantially equal distance along said service line, which comprises means for bringing the succeeding one of two adjacent repeater stations to a communicable state at the moment each movable object passes over the junction of two adjacent repeater stations, wherein said means allows the width of a gate for selecting a required one form among a series of time slots previously allotted to each repeater station in a predetermined order to be broadened to an extent corresponding to more than two time slots so as to permit a given repeater section of movable objects on which each repeater station should give information to overlap the immediately following repeater section.